Sept. 10, 1929.  H. PERROT  1,727,355
BRAKE MECHANISM
Original Filed Jan. 29, 1924
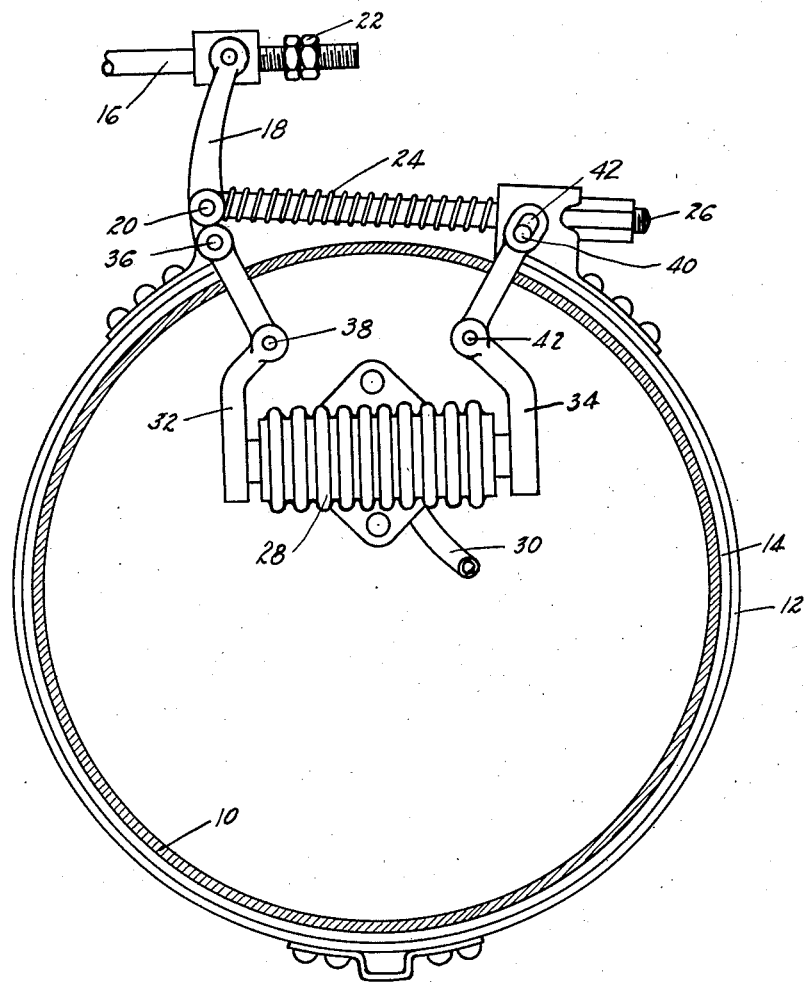
INVENTOR
HENRI PERROT
BY
Burton & McConkey,
ATTORNEYS.

Patented Sept. 10, 1929.

1,727,355

UNITED STATES PATENT OFFICE.

HENRI PERROT, OF PARIS, FRANCE, ASSIGNOR TO BENDIX CORPORATION, OF CHICAGO, ILLINOIS, A CORPORATION OF ILLINOIS.

BRAKE MECHANISM.

Original application filed January 29, 1924, Serial No. 689,218. Divided and this application filed November 16, 1927. Serial No. 233,654.

This invention relates to improvements in brake mechanism and particularly to brake mechanism intended for use on motor vehicles.

The object is to provide brake mechanism of such a character that two entirely separate applying devices are employed to apply the brakes. Each applying device may be operated jointly or each applying device may be operated independently of the other. I have shown one applying device as being entirely mechanical and the other applying device as including fluid operated mechanism.

The invention resides in the combination of the applying devices disclosed, the construction thereof, and the hookup employed to apply the brake. More particularly I employ an applying device having a mechanical overrunning connection with the brake in combination with the second applying device including a sylphon having an overrunning connection with the brake and I have shown these devices in combination with an externally arranged friction member associated with the usual brake drum and each applying device has its own arrangement of pivotally supported members connected with the friction means to apply the same to the drum whereby breakage in the connections of either applying device will not affect the other.

Other advantages and meritorious features of my invention will more fully appear from the following description, appended claims and accompanying drawing, wherein:

The figure of the drawing is a vertical sectional view through a brake drum and braking mechanism embodying my invention.

This application is a division of my application, Serial No. 689,218, filed January 29, 1924.

There is a brake drum 10, and associated therewith is a brake band 12 provided with friction facing 14 and having free separable ends.

One applying connection includes a pull rod 16 having an overrunning connection with a lever 18, pivotally supported as at 20, which lever is connected with the band 12 to apply the same. 22 indicates adjusting nuts to regulate the overrunning connection. 24 is a return spring mounted upon the bolt 26 to hold the free ends of the brake band apart.

The other applying device operates through a fluid actuated mechanism such as a sylphon 28. The fluid conduit is shown at 30. The opposite ends of this sylphon engage oppositely disposed pivotally supported levers 32 and 34. Lever 32 is connected with one end of the friction means as at 36 and this lever is pivotally supported at 38. Lever 34 is connected with the other end of the friction means by a stud or pin 40 carried by the end portion of the friction band 12, and which pin is disposed within a slot 42 found in the end of lever 34, permitting relative radial play of said parts. This lever is pivotally supported as at 42.

The brake band may be applied through the mechanical linkage 16 and 18 of the first applying device or it may be applied through the sylphon 28 of the second applying device. Each applying device operates independently of the other and the breakage in one will not affect the other. The first applying device has the overrunning connection heretofore described and the second applying device operates in a similar manner due to the loose engagement of the ends of the sylphon with the levers 32 and 34.

What I claim is:

1. A brake having a drum, friction means thereabout, two entirely separate applying devices, one connected with the friction means through mechanical linkage and the other connected therewith through a sylphon mechanism whereby said friction means may be drawn about the drum by either applying device independently of the other.

2. A brake having a drum, friction means thereabout, two entirely separate applying devices, one connected with the friction means through mechanical linkage situated entirely outside of the diameter of the drum and the other connected therewith through a sylphon situated entirely within the diameter of the drum whereby said friction means may be applied to the drum by either applying device independently of the other.

3. A brake having a drum, friction means thereabout, two entirely separate applying devices, one connected with the friction means through overrunning mechanical linkage lying entirely outside of the diameter of the drum and the other connected with the friction means through sylphon mechanism lying entirely within the diameter of the drum, which sylphon mechanism has a loose connection with the friction means whereby the same may be actuated by either applying device independently of the other and without actuation of the other.

4. A brake having a drum, friction means associated therewith having a free end, two entirely separate applying devices each having a pivotally supported lever engaging the free end of the friction means, which lever has an overrunning connection with its applying device whereby the friction means may be actuated by either applying device independently of the other.

5. A brake having a drum, friction means associated therewith having free separable ends, two entirely separate applying devices, one applying device provided with a pivotally supported lever having an overrunning connection therewith and connected with the free ends of the friction means, the other applying device provided with a pair of pivotally supported levers each having a loose connection therewith, one of which is secured to one free end of the friction means and the other one of which is secured to the other free end of the friction means whereby the friction means may be actuated by either applying device independently of the other.

6. A braking system comprising a drum, friction means engageable therewith having free separable ends, two entirely separate applying devices, one applying device provided with a pivotally supported lever connected with both ends of the friction means, the other applying device provided with fluid operated mechanism coupled with a pair of pivotally supported levers, one connected with each end of the friction means whereby said friction means may be applied to the drum by either applying device.

7. A braking system comprising a drum, friction means engageable therewith having free separable ends, two entirely separate applying devices, one applying device provided with a pivotally supported lever connected with both ends of the friction means, the other applying device provided with a sylphon, the opposite ends of which engage opposed pivotally supported levers, one connected with one end of the friction means and the other connected with the other end thereof.

In testimony whereof, I have hereunto signed my name.

HENRI PERROT.